United States Patent
Lindholm

(10) Patent No.: US 9,686,632 B2
(45) Date of Patent: Jun. 20, 2017

(54) METHOD AND APPARATUS FOR ACCESSING VIRTUAL SMART CARDS

(75) Inventor: Rune Adolf Lindholm, Sottunga (FI)

(73) Assignee: Nokia Technologies Oy, Espoo (FI)

( * ) Notice: Subject to any disclaimer, the term of this patent is extended or adjusted under 35 U.S.C. 154(b) by 91 days.

(21) Appl. No.: 14/344,162

(22) PCT Filed: Sep. 16, 2011

(86) PCT No.: PCT/IB2011/054071
§ 371 (c)(1),
(2), (4) Date: Mar. 11, 2014

(87) PCT Pub. No.: WO2013/038236
PCT Pub. Date: Mar. 21, 2013

(65) Prior Publication Data
US 2014/0342719 A1    Nov. 20, 2014

(51) Int. Cl.
*H04Q 7/10*       (2006.01)
*H04W 4/00*      (2009.01)
(Continued)

(52) U.S. Cl.
CPC ............ *H04W 4/003* (2013.01); *G06F 21/53* (2013.01); *G06F 21/57* (2013.01); *G06F 21/77* (2013.01);
(Continued)

(58) Field of Classification Search
CPC ... H04W 48/18; H04W 4/003; H04W 60/005; H04W 12/08; H04W 8/18; H04W 12/12; H04W 4/001
(Continued)

(56) References Cited

U.S. PATENT DOCUMENTS

| 8,874,077 B2 * | 10/2014 | Bergenwall ................... 455/410 |
| 2010/0062808 A1 * | 3/2010 | Cha et al. ..................... 455/558 |

(Continued)

FOREIGN PATENT DOCUMENTS

| WO | 2009/039380 A2 | 3/2009 |
| WO | 2009051377 | 4/2009 |

(Continued)

OTHER PUBLICATIONS

"Identification Cards—Integrated Circuit Cards—Part 4: Organization, Security and Commands for Interchange", ISO/IEC 7816-4, Jan. 15, 2005, 90 pages.
(Continued)

*Primary Examiner* — Ajit Patel
*Assistant Examiner* — Julio Perez
(74) *Attorney, Agent, or Firm* — Mintz Levin Cohn Ferris Glovsky and Popeo, P.C.

(57) ABSTRACT

Various methods are provided for facilitating a software smart card environment consisting of multiple virtual UICCs (vUICC). One example method may comprise determining the location of one or more applications stored on a plurality of vUICCs, wherein the plurality of vUICCs are hosted in a secure environment. The method may also comprise receiving a request from a terminal application to execute an application of the one or more applications stored on the plurality of vUICCs. The method may further comprise determining a vUICC identification relating to the requested application. The method may further comprise causing a logical channel to be established with the requested application on a vUICC using the determined vUICC identification. Similar and related example apparatuses and example computer program products are also provided.

17 Claims, 5 Drawing Sheets

(51) Int. Cl.
*G06F 21/77* (2013.01)
*G06F 21/53* (2013.01)
*G06F 21/57* (2013.01)
*H04W 8/22* (2009.01)
*H04W 76/02* (2009.01)
*H04W 12/06* (2009.01)
*H04W 88/06* (2009.01)

(52) U.S. Cl.
CPC .............. *H04W 8/22* (2013.01); *H04W 12/06* (2013.01); *H04W 76/02* (2013.01); *H04W 88/06* (2013.01)

(58) Field of Classification Search
USPC ................... 455/411, 418, 435.1, 414.1, 558
See application file for complete search history.

(56) References Cited

U.S. PATENT DOCUMENTS

| | | |
|---|---|---|
| 2010/0311468 A1 | 12/2010 | Shi et al. |
| 2011/0003580 A1 | 1/2011 | Belrose et al. |
| 2012/0108205 A1* | 5/2012 | Schell .................. H04W 4/001 455/411 |
| 2013/0023235 A1* | 1/2013 | Fan et al. ...................... 455/411 |
| 2013/0121483 A1* | 5/2013 | Murakami et al. ....... 379/212.01 |
| 2014/0237101 A1* | 8/2014 | Park .............................. 709/223 |

FOREIGN PATENT DOCUMENTS

| | | |
|---|---|---|
| WO | 2010027765 | 3/2010 |
| WO | 2010/144479 A2 | 12/2010 |

OTHER PUBLICATIONS

"Identification Cards—Integrated Circuit Cards—Part 3: Cards With Contacts—Electrical Interface and Transmission Protocols", ISO/IEC 7816-3, Nov. 1, 2006, 58 pages.

International Search Report received for corresponding Patent Cooperation Treaty Application No. PCT/IB2011/054071, dated Jun. 27, 2012, 5 pages.

ETSI TS 102 221, v.8.2.0; Jun. 2009; Smart Cards; UICC-Terminal interface; Physical and logical characteristics; (Release 8); abstract; Chapter 8.

* cited by examiner

METHOD AND APPARATUS FOR ACCESSING VIRTUAL SMART CARDS

RELATED APPLICATION

This application was originally filed as PCT Application No. PCT/IB2011/054071 filed Sep. 16, 2011.

TECHNOLOGICAL FIELD

Embodiments of the present invention relate generally to smart card technology and, more particularly, relate to a method, apparatus, and computer program product for accessing a plurality of hosted virtual smart cards.

BACKGROUND

A UICC is a smart card used in mobile terminals. The UICC ensures the integrity and security of personal data, and the UICC typically has additional available storage space. In a Global System for Mobile Communications (GSM) network, the UICC contains a subscriber identity module or subscriber identification module (SIM) application and in a Universal Mobile Telecommunications System (UTMS) network a SIM or a universal SIM. The UICC may come in the form of a removable chip that is insertable in a mobile terminal or it may take the form of a software based UICC that is embedded in the mobile terminal.

A physical and/or standard UICC has an internal structure as defined by International Organization of Standardization (ISO)/International Electrotechnical Commission (IEC) 7816-4, which is hereby incorporated by reference. Applications stored on the UICC are generally associated with an Application Dedicated File (ADF). The ADF may be either part of a file structure under the master file (MF) or the ADF may exist separately within the UICC. In some embodiments, applications are part of a tree that are connected to the MF and thus can be selected by a path from the MF. In other embodiments, applications may be selected by an Application Identifier (AID). For example, an AID may provide a current location of an application within an UICC or Secure Element (SE).

In some embodiments multiple applications may be present on a UICC. These applications are selectable by their AID and may be added and removed from the UICC. Applications that are connected to the MF may also be removed; however these applications contain a fixed File ID and may be required by the mobile terminal for operation.

When a UICC is powered up and/or when the UICC reset is released, the UICC will deliver an Answer to Reset (ATR) of up to 32 bytes to the mobile terminal. In example embodiments, using the ATR information, the mobile terminal may determine the capabilities and characteristics of the UICC.

Between the UICC and the mobile terminal, there are also logical connections in the form of logical channels. For example, logical channel 0 is automatically opened after the ATR has been sent. In example embodiments, a logical channel is associated with a set of pointers that tracks the logical channel endpoint on the UICC. The structure of the UICC is defined in TS 102 221, which is hereby incorporated by reference.

Generally the UICC is issued by a mobile phone carrier and is configured to provide access to a mobile network. As stated above, other applications may be installed on the UICC as it is considered to be a secure medium that would be ideal for personal data, such as financial data. However, in most cases only a single application or single application family is installed on the UICC. There are many reasons why the UICC environment has not been used for separate and distinct applications; however the primary reason is that most providers do not allow other applications on their cards. For example a mobile service provider may not want a competitor's application on its UICC. One potential solution is the use of multiple UICCs; however a mobile terminal generally only has a single hardware location for a UICC.

BRIEF SUMMARY

Methods, apparatuses, and computer program products are provided herein for facilitating a software smart card environment consisting of multiple virtual UICCs (vUICC). In an embodiment, multiple vUICCs may be configured as independent UICCs and they may be hosted by an embedded UICC (eUICC). In particular, the method, apparatus and computer program product of example embodiments of the present invention establish a communications link between a vUICC (or an application on a vUICC) and a terminal application as if the application on the vUICC was resident on a local single hardware smart card or other secure device or environment, such as a Trusted Secure Environment (TSE), that provides smart card like functionality.

One example method may comprise determining the location of one or more applications stored on a plurality of vUICCs, wherein the plurality of vUICCs are hosted in a secure environment. The method may also comprise receiving a request from a terminal application to execute an application of the one or more applications stored on the plurality of vUICCs. The method may further comprise determining a vUICC identification relating to the requested application. The method may further comprise causing a logical channel to be established with the requested application on a vUICC using the determined vUICC identification.

In another embodiment, an apparatus comprising a processor and a memory comprising software, with the memory and the software configured to, with the processor, to determine the location of one or more applications stored on a plurality of vUICCs, wherein the plurality of vUICCs are hosted in a secure environment. The apparatus is further caused to receive a request from a terminal application to execute an application of the one or more applications stored on the plurality of vUICCs. The apparatus is further caused to determine a vUICC identification relating to the requested application. The apparatus is further caused to cause a logical channel to be established with the requested application on a vUICC using the determined vUICC identification.

In a further embodiment, a computer program product is provided that comprises at least one computer readable non-transitory memory having program code stored thereon with the program code which when executed by an apparatus causing the apparatus at least to determine the location of one or more applications stored on a plurality of vUICCs, wherein the plurality of vUICCs are hosted in a secure environment. A computer program product also comprises program code that is further configured to receive a request from a terminal application to execute an application of the one or more applications stored on the plurality of vUICCs. A computer program product also comprises program code that is further configured to determine a vUICC identification relating to the requested application. A computer program product also comprises program code that is further configured to cause a logical channel to be established with the requested application on a vUICC using the determined vUICC identification.

One example apparatus may comprise means for determining the location of one or more applications stored on a plurality of vUICCs, wherein the plurality of vUICCs are hosted in a secure environment. An apparatus may also comprise means for receiving a request from a terminal application to execute an application of the one or more applications stored on the plurality of vUICCs. An apparatus may further comprise means for determining a vUICC identification relating to the requested application. The apparatus may further comprise means for causing a logical channel to be established with the requested application on a vUICC using the determined vUICC identification.

BRIEF DESCRIPTION OF THE DRAWINGS

Figure 1:
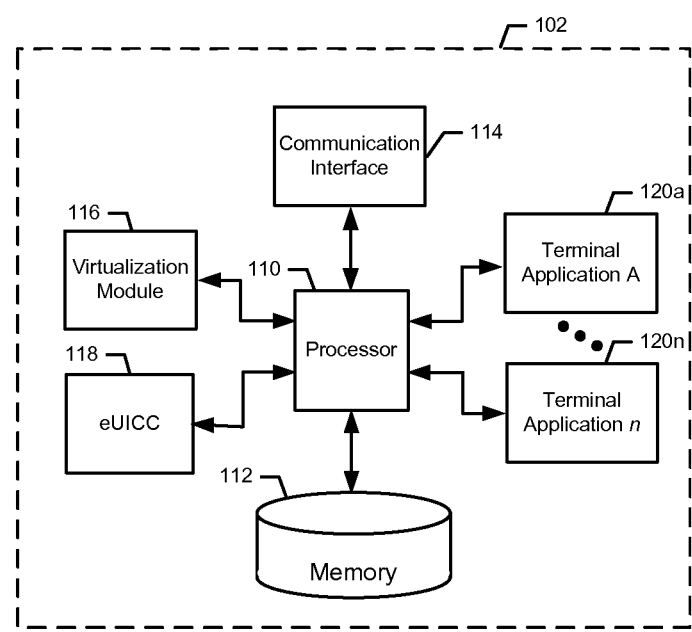
Figure 2:
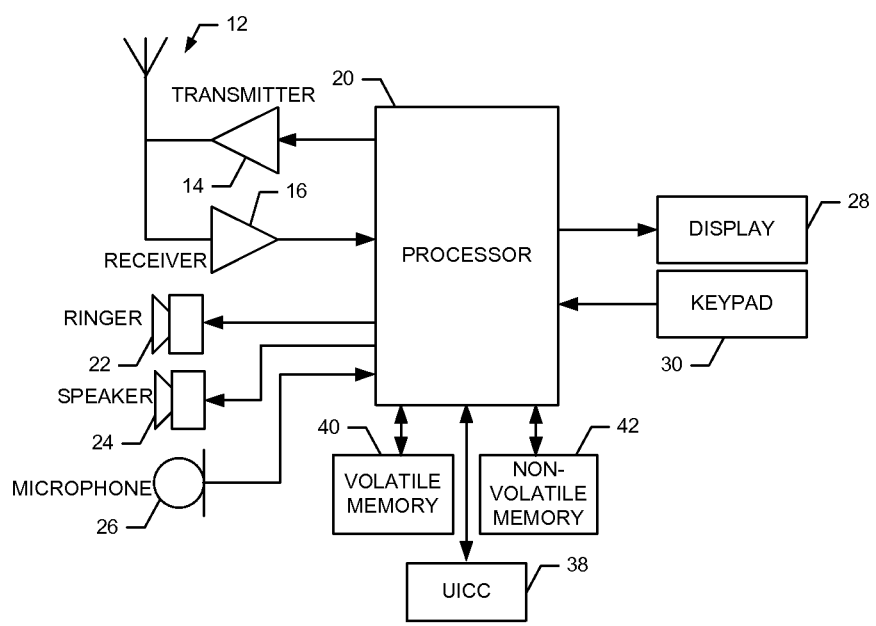
Figure 3:
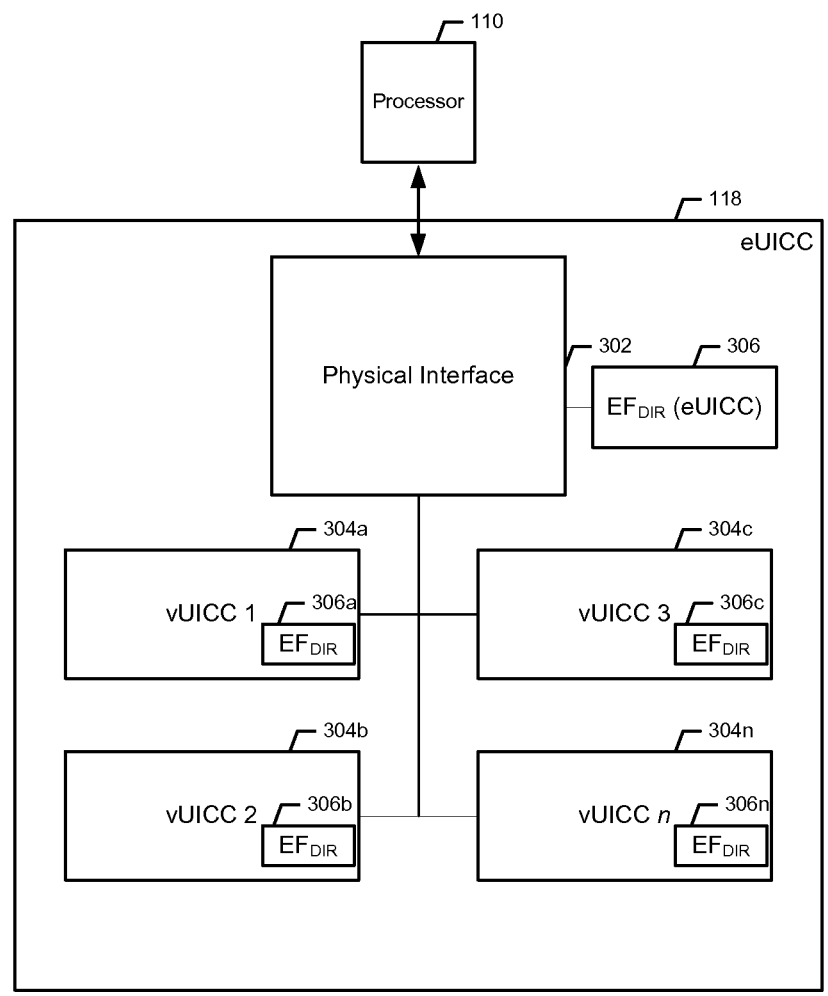
Figure 4:
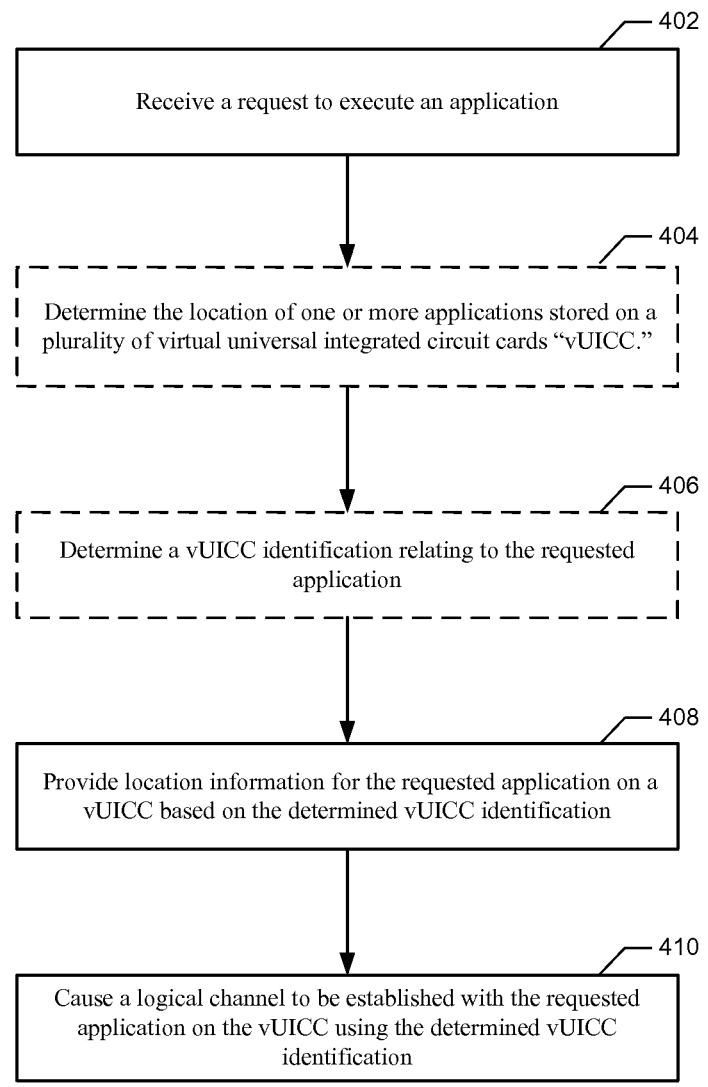
Figure 5:
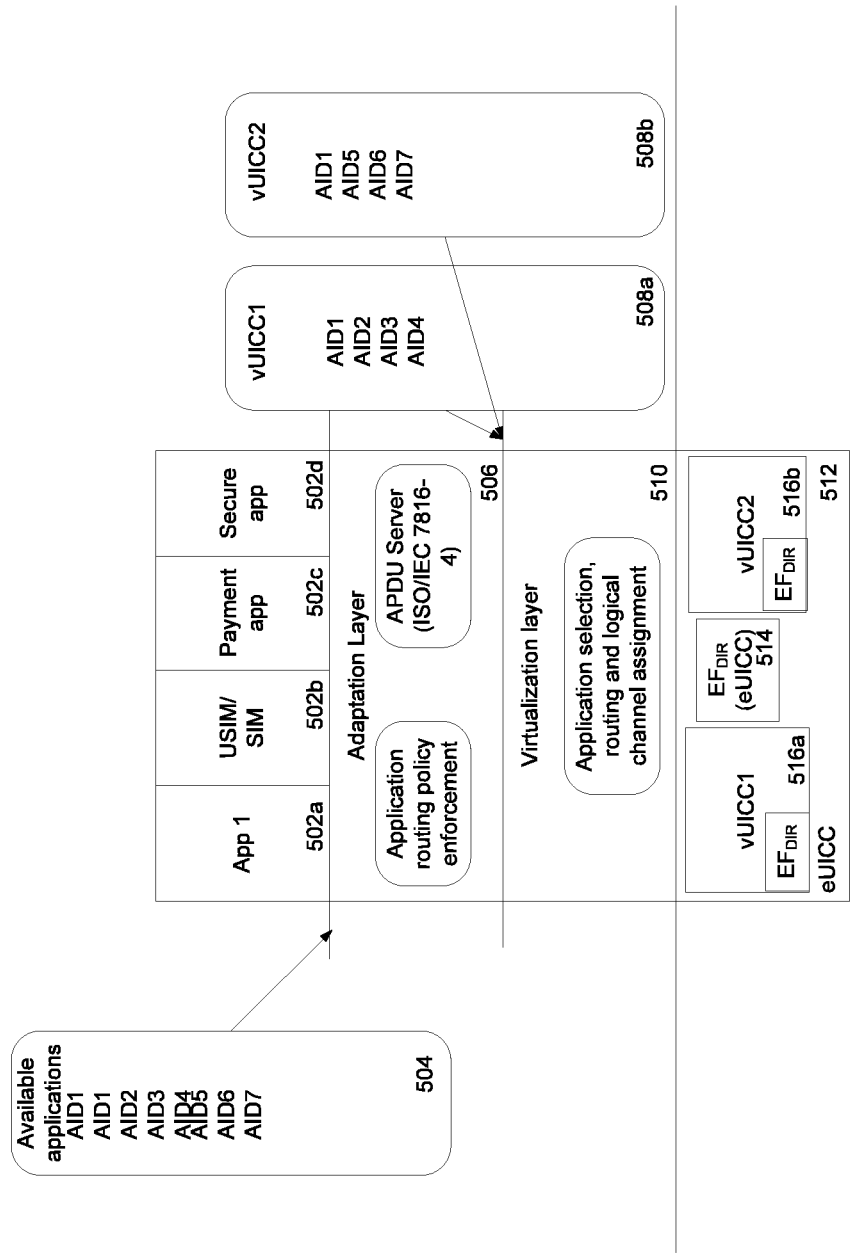

Having thus described embodiments of the invention in general terms, reference will now be made to the accompanying drawings, which are not necessarily drawn to scale, and wherein:

FIG. 1 illustrates a block diagram of eUICC virtualization system for establishing a logical channel between a terminal application and an application on a vUICC according to an example embodiment of the present invention;

FIG. 2 is a schematic block diagram of a mobile terminal according to an example embodiment of the present invention;

FIG. 3 illustrates an example eUICC according to an example embodiment of the invention;

FIG. 4 illustrates a flowchart according to an example method for establishing a logical channel according to an example embodiment of the invention; and FIG. 5 illustrates an example layer diagram according to an example embodiment of the present invention.

DETAILED DESCRIPTION

Example embodiments will now be described more fully hereinafter with reference to the accompanying drawings, in which some, but not all embodiments are shown.

Indeed, the embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

As used herein, the term "circuitry" refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (comprising digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of "circuitry" applies to all uses of this term in this application, comprising in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in a server, a cellular network device, or other network device.

As used herein, the term embedded UICC (eUICC) refers to and/or is interchangeable with a software UICC, an embedded smart card, and/or a software smart card. A eUICC is distinct from a UICC which as described herein refers to a physical smart card.

In an example embodiment, a software smart card such as a eUICC provides a secure environment. The eUICC may also be configured to host one or more vUICCs that contain one or more applications accessible by terminal applications. Example embodiments as described herein are configured to route a request for a communications link, such as a logical channel, from a terminal application to a vUICC. The eUICC is configured to host and/or access over the air a plurality of vUICCs and thus creates an environment similar to a physical UICC but with the added functionality as described herein. Advantageously and as described by embodiments of the current invention, each vUICC may be configured to function as its own independent UICC.

FIG. 1 illustrates a block diagram of a eUICC virtualization system 102 for facilitating the use of a eUICC according to an example embodiment of the present invention. It will be appreciated that the eUICC virtualization system 102 is provided as an example of one embodiment of the invention and should not be construed to narrow the scope or spirit of the invention in any way. In this regard, the scope of the disclosure encompasses many potential embodiments in addition to those illustrated and described herein. As such, while FIG. 1 illustrates one example of a configuration of an apparatus for facilitating a eUICC environment, other configurations may also be used to implement embodiments of the present invention.

The eUICC virtualization system 102 may be embodied as a desktop computer, laptop computer, mobile terminal, tablet, mobile computer, mobile phone, mobile communication device, one or more servers, one or more network nodes, game device, digital camera/camcorder, audio/video player, television device, radio receiver, digital video recorder, positioning device, any combination thereof, and/or the like. In an example embodiment, the eUICC virtualization system 102 is embodied as a mobile terminal, such as that illustrated in FIG. 2.

In this regard, FIG. 2 illustrates a block diagram of a mobile terminal 10 representative of one embodiment of a eUICC virtualization system 102. It should be understood, however, that the mobile terminal 10 illustrated and hereinafter described is merely illustrative of one type of eUICC virtualization system 102 that may implement and/or benefit from embodiments of the present invention and, therefore, should not be taken to limit the scope of the present invention. While several embodiments of the user terminal (e.g., mobile terminal 10) are illustrated and will be hereinafter described for purposes of example, other types of user terminals, such as mobile telephones, mobile computers, portable digital assistants (PDAs), pagers, laptop computers, desktop computers, gaming devices, televisions, and other types of electronic systems, may employ embodiments of the present invention.

As shown, the mobile terminal 10 may comprise an antenna 12 (or multiple antennas 12) in communication with a transmitter 14 and a receiver 16. The mobile terminal 10 may also comprise a processor 20 configured to provide signals to and receive signals from the transmitter and receiver, respectively. The processor 20 may, for example, be embodied as various means comprising circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements comprising integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. These signals sent and received by the processor 20 may comprise signaling information in accordance with an air interface standard of an applicable cellular system, and/or any number of different wireline or wireless networking techniques, comprising but not limited to Wireless-Fidelity (Wi-Fi), wireless local access network (WLAN) techniques such as Institute of Electrical and Electronics Engineers (IEEE) 802.11, 802.16, and/or the like. In addition, these signals may comprise speech data, user generated data, user requested data, and/or the like. In this regard, the mobile terminal may be capable of operating with one or more air interface standards, communication protocols, modulation types, access types, and/or the like. More particularly, the mobile terminal 10 may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of operating according to Wireless Fidelity (Wi-Fi) or Worldwide Interoperability for Microwave Access (Wi-MAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal 10 may be allocated between these devices according to their respective capabilities. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface comprising, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (e.g., software and/or firmware) stored on a memory accessible to the processor 20 (e.g., volatile memory 40, non-volatile memory 42, and/or the like). Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments comprising a keypad, the keypad may comprise numeric (0-9) and related keys (#, *), and/or other keys for operating the mobile terminal.

The mobile terminal 10 may comprise memory, such as a smart cart, SIM and/or a UICC 38, a removable user identity module (R-UIM), and/or the like, which may store information elements related to a mobile subscriber. In an embodiment, having a eUICC, the SIM and/or UICC 38 may be optional as the SIM functionality may be installed on the eUICC. Alternatively or additionally, the eUICC and the SIM and/or UICC 38 may work together. In addition to the SIM, the mobile terminal may comprise other removable and/or fixed memory. The mobile terminal 10 may comprise other non-transitory memory, such as volatile memory 40 and/or non-volatile memory 42. For example, volatile memory 40 may comprise Random Access Memory (RAM)

comprising dynamic and/or static RAM, on-chip or off-chip cache memory, and/or the like. Non-volatile memory 42, which may be embedded and/or removable, may comprise, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may comprise a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Returning to FIG. 1, in an example embodiment, the eUICC virtualization system 102 comprises various means for performing the various functions herein described. These means may comprise one or more of a processor 110, memory 112, communication interface 114, virtualization module 116, eUICC 118, and/or terminal application 120a-n. The means of the eUICC virtualization system 102 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g. memory 112) that is executable by a suitably configured processing device (e.g., the processor 110), or some combination thereof.

The processor 110 may, for example, be embodied as various means comprising one or more microprocessors with accompanying digital signal processor(s), one or more processor(s) without an accompanying digital signal processor, one or more coprocessors, one or more multi-core processors, one or more controllers, processing circuitry, one or more computers, various other processing elements comprising integrated circuits such as, for example, an ASIC or FPGA, or some combination thereof. Accordingly, although illustrated in FIG. 1 as a single processor, in some embodiments the processor 110 comprises a plurality of processors. The plurality of processors may be in operative communication with each other and may be collectively configured to perform one or more functionalities of the eUICC virtualization system 102 as described herein. The plurality of processors may be embodied on a single computing device or distributed across a plurality of computing devices collectively configured to function as the eUICC virtualization system 102. In embodiments wherein the eUICC virtualization system 102 is embodied as a mobile terminal 10, the processor 110 may be embodied as or comprise the processor 20. In an example embodiment, the processor 110 is configured to execute instructions stored in the memory 112 or otherwise accessible to the processor 110. These instructions, when executed by the processor 110, may cause the eUICC virtualization system 102 to perform one or more of the functionalities of the eUICC virtualization system 102 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, non-transitory memory, such as volatile memory, non-volatile memory, or some combination thereof. Although illustrated in FIG. 1 as a single memory, the memory 112 may comprise a plurality of memories. The plurality of memories may be embodied on a single computing device or may be distributed across a plurality of computing devices collectively configured to function as the eUICC virtualization system 102. In various example embodiments, the memory 112 may comprise, for example, a hard disk, random access memory, cache memory, flash memory, a removable memory card, a compact disc read only memory (CD-ROM), digital versatile disc read only memory (DVD-ROM), an optical disc, circuitry configured to store information, or some combination thereof. In embodiments wherein the eUICC virtualization system 102 is embodied as a mobile terminal 10, the memory 112 may comprise the volatile memory 40 and/or the non-volatile memory 42. The memory 112 may be configured to store information, data, applications, instructions, or the like for enabling the eUICC virtualization system 102 to carry out various functions in accordance with various example embodiments.

The communication interface 114 may be embodied as any device or means embodied in circuitry, hardware, a computer program product comprising computer readable program instructions stored on a computer readable medium (e.g., the memory 112) and executed by a processing device (e.g., the processor 110), or a combination thereof that is configured to receive and/or transmit data to/from another computing device. For example, the communication interface 114 may be configured to receive application data over a network.

The virtualization module 116 may be embodied as various means, such as circuitry, hardware, a computer program product comprising computer readable program instructions stored on a computer readable medium (e.g., the memory 112) and executed by a processing device (e.g., the processor 110), or some combination thereof and, in one embodiment, is embodied as or otherwise controlled by the processor 110. In embodiments wherein the virtualization module 116 is embodied separately from the processor 110, the virtualization module 116 may be in communication with the processor 110. The virtualization module 116 may further be in communication with one or more of the memory 112, communication interface 114, the eUICC 118 and/or the terminal applications 120, such as via a bus.

In embodiments of the present invention, the virtualization module 116 is configured to enable the creation of a logical channel between a terminal application and a vUICC or application on the vUICC residing within the eUICC 118. See, for example, vUICCs 304a-n of FIG. 3. The applications on vUICCs 304a-n can then be discovered by selecting the EFDIRS 306a. Similarly, available applications on the eUICC are listed in an elementary file directory (EFDIR) 306. In an embodiment, a logical channel is a communications link that is assigned a number of pointers to an application on a vUICC and the various related end point locations.

In embodiments of the present invention, the eUICC 118 is configured to host a plurality of vUICCs as is shown in FIG. 3. The eUICC may also be configured to communicate with remote vUICC that are accessible over the air via the communications interface 114. The eUICC 118 is configured to provide the virtualization module 116 with information about each of the vUICCs, for example by using the Protocol and Parameter Selection (PPS) procedure. The eUICC 118 may provide one or more files/data objects giving information about the vUICCs and the applications they contain as well as vUICC identification to the virtualization module 116.

In an embodiment, a eUICC 118 is further configured to transmit an ATR on power up and set the default location for logical channel 0 to the MF. However in some embodiments, a eUICC 118 may not have a MF and therefore the physical interface, such as physical interface 302 shown in FIG. 3, may act as the MF as is specified in ISO/IEC 7816-3. ISO/IEC 7816-3 is hereby incorporated by reference. Alternatively or additionally, other physical interfaces may also be used.

In an embodiment, the physical interface of the eUICC 118 is configured to provide an ATR so as to appear to the terminal applications 120 as a physical UICC. Alternatively or additionally, as the eUICC may not have an MF itself, the eUICC 118 may provide one of the plurality of vUICCs as the default UICC after power up. In example embodiments, various selection criteria may be used to select a default vUICC such as, but not limited to, the last selected vUICC before power down, user presets and/or the like. In example embodiments in an instance in which a virtualization module resides on the eUICC, in a secure element and/or a Trusted Execution Environment the virtualization module may be configured to provide the AIDs of all vUICCs combined into the eUICC EFDIR as the default UICC. In an embodiment the vUICCs may then appear as one logical UICC to the terminal applications. In an instance in which there is an overlap with respect to the AIDs on different vUICCs, the virtualization module may be configured to modify an AID to be stored in the eUICC EFDIR in order to make them unique within the default UICC. The modification is carried out in a way that the application is still recognized by the terminal applications, e.g. the 3GPP application code remains unchanged.

The virtualization module 116 is further configured to provide a series of commands, such as a SELECT and MANAGE CHANNEL commands, to establish the communications link, such as a logical channel, to the plurality of applications on the plurality of vUICCs hosted by the eUICC 118. The SELECT command may be configured to open a logical channel when selecting an application and/or file whereas the MANAGE CHANNEL may be configured to open and close logical channels. In an embodiment, the SELECT command may be modified in such a way that when performing a selection indicating an AID/DF name in the parameters P1-P2 a unique identifier of the vUICC hosted by the eUICC 118 may be used for selecting the vUICC. The unique identifier may be added in front of the AID in the command body. If added to the front of the AID, the end point of the logical channel of the SELECT command may be used to indicate the vUICC on which the application indicated by the AID resides on. Alternatively or additionally, a P1 coding for the SELECT command may be used to indicate that the selection is for a particular vUICC using a vUICC identification. The SELECT command, as is used herein, generally comprises 5 bytes, see for example ISO/IEC 7816-4. In some embodiments, the SELECT command is followed either by a command data field (Lc) or a response data field (Le). In particular, the five bytes of the SELECT command comprise, but are not limited to the first byte which is the Class Byte (CLA), the second byte is an instruction byte (INS) and the final three bytes are the parameters P1, P2 and P3. For example, the class byte (CLA) is a byte in the command header that carries the logical channel information. The virtualization module 116 is configured to use a CLA byte in a command, such as the SELECT command, to indicate a logical channel that may be used to select different applications on the eUICC 118.

In an embodiment, a command such as a MANAGE CHANNEL command is used by the virtualization module 116 to create a communications channel, such as a logical channel, to a vUICC hosted by the eUICC 118. Once the communications channel is open, an application command may be transmitted from a terminal application, such as terminal applications 120*a*-*n* to the application in a vUICC.

In an embodiment, the MANAGE CHANNEL command may be modified to add a unique identifier for a vUICC hosted by a eUICC 118. The unique identifier, such as a vUICC identification, is configured to identify, a vUICC to which a logical channel is to be opened. Alternatively or additionally, a location pointer of the logical channel when it has been opened may be directed to the master file MF or a physical interface of the vUICC as indicated in the MANAGE CHANNEL command.

In an embodiment, a MANAGE CHANNEL command may be modified to add command body data field (Lc) to the command. In the command body data field the unique identifier, such as the vUICC identification, of the vUICC may be supplied. In some embodiments, this identifier would be used for opening channel 0 as other channels would be opened based on known endpoint on the eUICC. The virtualization module 116 may be configured to use a command, such as the MANAGE CHANNEL command from channel 0, to select the requested vUICC and the application on it.

Alternatively or additionally, the virtualization module 116 may control access to applications and resources on the smart card using a verification of a personal identification number or other authentication means. The virtualization module 116 may only establish the logical channel where the verification was successfully performed. In some embodiments, if verification, such as a PIN, was successfully performed on example logical channel 1 and a new channel is opened from channel 1 using the MANAGE CHANNEL command then PIN verification remains valid on the new logical channel. However, using the MANAGE CHANNEL command to open a logical channel to a vUICC or an application on the vUICC the security context may not be inherited, thus requiring new security information, e.g. authentication.

FIG. 4 illustrates an example flowchart of the operations performed by a method, apparatus and computer program product, such as apparatus 102 of FIG. 1, in accordance with one embodiment of the present invention are illustrated. It will be understood that each block of the flowchart, and combinations of blocks in the flowchart, may be implemented by various means, such as hardware, firmware, processor, circuitry and/or other device associated with execution of software comprising one or more computer program instructions. For example, one or more of the procedures described above may be embodied by computer program instructions. In this regard, the computer program instructions which embody the procedures described above may be stored by a memory 112 of an apparatus employing an embodiment of the present invention and executed by a processor 110 in the apparatus. As will be appreciated, any such computer program instructions may be loaded onto a computer or other programmable apparatus (e.g., hardware)

to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIG. 4, when executed, convert a computer or processing circuitry into a particular machine configured to perform an example embodiment of the present invention. Accordingly, the operations of FIG. 4 define an algorithm for configuring a computer or processing 112, to perform an example embodiment. In some cases, a general purpose computer may be provided with an instance of the processor which performs the algorithm of FIG. 4 to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations herein may be modified or further amplified as described below. Moreover, in some embodiments additional optional operations may also be included (some examples of which are shown in dashed lines in FIG. 4). It should be appreciated that each of the modifications, optional additions or amplifications below may be included with the operations above either alone or in combination with any others among the features described herein.

FIG. 4 is an example flowchart illustrating establishing a logical channel performed in accordance with an embodiment of the present invention. As shown in operation 402, the apparatus 102 embodied, for example, by a mobile terminal 10, may comprise means, such as the processor 110, the communications interface 114, the virtualization module 116, or the like, for receiving a request to execute an application. In an embodiment, an apparatus, such as the virtualization module 116 may be configured to receive a request from a terminal application to run an application generally on a vUICC and hosted by a eUICC. In an embodiment the request may be from a terminal application, such as terminal applications 120a-n.

As shown in operation 404, the apparatus 102 embodied, for example, by a mobile terminal 10, may comprise means, such as the processor 110, the virtualization module 116, or the like, for determining the location of one or more applications stored on a plurality of vUICCs. In an embodiment, the vUICC identification provides the location information to the virtualization module 116. A vUICC identification is identified by the mobile terminal 10, using means such as the processor 110, by accessing the EFDIR of the eUICC 118. In an embodiment, the content of the eUICC EFDIR may be modified to incorporate the vUICC identity, such as an ICC ID of a UICC. In an alternate embodiment, an elementary file may have a listing of available vUICCs on an eUICC. The vUICC may then be selected using the SELECT command. The SELECT command may be configured to provide the vUICC ID indicating a vUICC to be selected. The applications on a vUICC can then be discovered by selecting the EFDIR on this vUICC, ISO/IEC 7816-4 specifies alternative and additional methods to discover applications that are supported on a UICC. Similarly, available applications on the eUICC are listed in an EFDIR. Instructions for the mobile terminal 10 to retrieve the EFDIR content may be indicated in the ATR, and/or the card characteristics information if present. In order for the mobile terminal 10 to select an application, the mobile terminal 10 is configured to retrieve the AID for an application by looking for the application in EFDIR. EFDIR contains a list of applications supported by the card each indicated by their AID. For example USIM applications may be identified by a specific part of the AID which comprise 3G application code.

As shown in operation 406, the apparatus 102 embodied, for example, by a mobile terminal 10, may comprise means, such as the processor 110, the virtualization module 116, or the like, for determining a vUICC identification (ID) relating to the received application request. For example the determined location of each vUICC and each application of each vUICC was described with reference to operation 404. In some embodiments the vUICC ID provides the command body data field, Lc, for the MANAGE CHANNEL command.

As shown in operation 408, the apparatus 102 embodied, for example, by a mobile terminal 10, may comprise means, such as the processor 110, the virtualization module 116, or the like, for providing location information for the requested application on a vUICC based on the determined vUICC identification. For example, based on the vUICC, the location of an application may be determined based on an access list of AIDs, by unique identifier, and/or available for each specific vUICC.

As shown in operation 410, the apparatus 102 embodied, for example, by a mobile terminal 10, may comprise means, such as the processor 110, the virtualization module 116, or the like, for causing a logical channel to be established with the requested application on the vUICC using the determined vUICC identification. In an embodiment, the virtualization module 116 is configured to create a logical channel using a command, such as the MANAGE CHANNEL command using with the determined vUICC identification, between the terminal application and the vUICC or the application on the vUICC hosted by a eUICC, such as eUICC 118. In an embodiment, the processor 110 may select an eUICC EFDIR by issuing a SELECT command. The processor 110 may then read each record by using a command, such as a READ RECORDS command to read a vUICC ID and an AID of the application on a vUICC. Each application on a vUICC may then be represented by a record in the eUICC EFDIR. The processor 110 then may be further configured to establish a logical channel to an application on a vUICC by using the SELECT or MANAGE CHANNEL command as described previously.

FIG. 5 illustrates an example layer diagram according to an example embodiment of the present invention. Terminal applications 502a-d represent example terminal applications that are configured to operate on an apparatus, such as apparatus 20. These terminal applications 502a-d are configured to establish a logical channel to an application on a vUICC, such as vUICCs 516*a* and 516*b*. In order to establish the logical channel, an adaption layer and a virtualization layer are advantageously used to allow terminal applications 502*a-d* to believe a requested application on the vUICC was actually resident on a local single hardware smart card. In some embodiments the virtualization layer may reside on the Secure Element or Trusted Execution Environment that hosts the eUICC.

An interface between the terminal applications 502*a-d* and an adaptation layer 506 may comprise a series of AIDs 504 that identify applications in a secure environment, such as on the eUICC 512. The adaptation layer is then configured to provide application routing policy enforcement as well as an application protocol data unit (APDU) server, such as the APDU server described in ISO/IEC 7816-4. The adaption layer is further configured to identify a vUICC that is hosting a particular application based on provided vUICC AID information (508*a*-508*b*).

A virtualization layer 510 is also provided that is configured to provide application selection, routing and logical channel assignments. Thus the virtualization layer 510 is configured to provide the access information for a vUICC as if it was a resident smart card. As is shown with reference to FIG. 3, and as described herein, the applications on vUICCs identified by AID can then be discovered by selecting the EFDIRS 514, thus allowing for the creation of a logical channel between terminal applications 502*a-d* and vUICCs 516*a* and 516*b* or application on the vUICC 516*a* and 516*b* residing within the eUICC 512.

Advantageously, the apparatus 102, method and computer program product as described herein enables a mobile terminal 10 to provide a eUICC that is configured to host a plurality of vUICCs thereby providing the ability to have multiple applications by multiple issuers on a single eUICC. Additionally or alternatively, the apparatus 102, method and computer program product as described herein allows for existing terminal applications to communicate with vUICC based applications as if they were resident on a traditional UICC and thus reduces development costs with respect to the terminal applications.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be comprised within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   determining, by a processor, a location of one or more applications stored on a plurality of virtual universal integrated chip cards, wherein the plurality of virtual universal integrated chip cards are hosted in a secure environment comprising an embedded universal integrated chip card, wherein the hosting of the plurality of virtual universal integrated chip cards enables the embedded universal integrated chip card to at least provide access to a plurality of mobile networks associated with different mobile service providers and operating in accordance with different wireless communication protocols;
   receiving, at the processor, a request from a terminal application to execute an application of the one or more applications stored on the plurality of virtual universal integrated chip cards;
   determining, by the processor, a virtual universal integrated chip card identification relating to the requested application, wherein the virtual universal integrated chip card identification is configured to identify a logical channel for the requested application;
   providing, by the processor, location information for the requested application on a virtual universal integrated chip card, the location information being determined based at least on the virtual universal integrated chip card identification relating to the requested application; and
   causing, by the processor, the logical channel to be established with the requested application on the virtual universal integrated chip card using the determined virtual universal integrated chip card identification, wherein the logical channel is established by at least generating a command comprising at least one of the virtual universal integrated chip card identification, the requested application and a logical channel, and causing the generated command to be transmitted to an embedded universal integrated chip card that is hosting the virtual universal integrated chip card.

2. The method according to claim 1, further comprising providing location information for the requested application on the virtual universal integrated chip card based on the determined virtual universal integrated chip card identification.

3. The method according to claim 1, wherein the command is at least one of a select command or a manage channel command.

4. The method according to claim 1, further comprises modifying a manage channel command, wherein the manage channel command is modified to add the virtual universal integrated chip card identification.

5. The method according to claim 1, further comprises modifying a select command, wherein the select command is modified to add the virtual universal integrated chip card identification.

6. The method according to claim 1, wherein the application execution request is received from the terminal application.

7. The method according to claim 1, further comprising causing the virtual universal integrated chip card identification to be provided by a virtualization module, wherein the virtualization module resides in the secure environment and is configured to combine application identifiers from the plurality of virtual universal integrated chip cards into an embedded universal integrated chip card elementary file directory.

8. The method according to claim 1, wherein at least one of the plurality of virtual universal integrated chip cards stores a first application and a second application, wherein the first application provides access to a network operating in accordance with a first wireless communication protocol, and wherein the second application provides access to a network operating in accordance with a second wireless communication protocol.

9. The method according to claim 1, wherein a first of the plurality of virtual universal integrated chip cards stores a first application that provides access to a network associated with a first provider, and wherein a second of the plurality of virtual integrated chip cards stores a second application that provides access to a network associated with a second provider.

10. An apparatus comprising a processor and a memory comprising software, the memory and the software configured to, with the processor, cause the apparatus to at least:
   determine a location of one or more applications stored on a plurality of virtual universal integrated chip cards, wherein the plurality of virtual universal integrated chip cards are hosted in a secure environment comprising an embedded universal integrated chip card, wherein the hosting of the plurality of virtual universal integrated chip cards enables the embedded universal integrated chip card to at least provide access to a plurality of mobile networks associated with different mobile service providers and operating in accordance with different wireless communication protocols;
   receive a request from a terminal application to execute an application of the one or more applications stored on the plurality of virtual universal integrated chip cards;
   determine a virtual universal integrated chip card identification relating to the requested application, wherein the virtual universal integrated chip card identification is configured to identify a logical channel for the requested application;
   provide, by the processor, location information for the requested application on a virtual universal integrated chip card, the location information being determined based at least on the virtual universal integrated chip card identification relating to the requested application; and
   cause the logical channel to be established with the requested application on the virtual universal integrated chip card using the determined virtual universal integrated chip card identification, wherein the logical channel is established by at least generating a command comprising at least one of the virtual universal integrated chip card identification, the requested application and a logical channel, and causing the generated command to be transmitted to an embedded universal integrated chip card that is hosting the virtual universal integrated chip card.

11. The apparatus according to claim 10, wherein the at least one memory comprising the computer program code is further configured to, with the at least one processor, provide location information for the requested application on the virtual universal integrated chip card based on the determined virtual universal integrated chip card identification.

12. The apparatus according to claim 10, wherein the command is at least one of a select command or a manage channel command.

13. The apparatus according to claim 10, wherein the at least one memory comprising the computer program code is further configured to, with the at least one processor, modify a manage channel command, wherein the manage channel command is modified to add the virtual universal integrated chip card identification.

14. The apparatus according to claim 10, wherein the at least one memory comprising the computer program code is further configured to, with the at least one processor, modify a select command, wherein the select command is modified to add the virtual universal integrated chip card identification.

15. The apparatus according to claim 10, wherein the application execution request is received from the terminal application.

16. The apparatus according to claim 10, wherein the at least one memory comprising the computer program code is further configured to, with the at least one processor, cause the virtual universal integrated chip card identification to be provided by a virtualization module, wherein the virtualization module resides in the secure environment and is configured to combine application identifiers from the plurality of virtual universal integrated chip cards into an embedded universal integrated chip card elementary file directory.

17. A computer program product comprising at least one computer readable non-transitory memory having program code stored thereon, the program code which when executed by an apparatus cause the apparatus at least to:
   determine a location of one or more applications stored on a plurality of virtual universal integrated chip cards, wherein the plurality of virtual universal integrated chip cards are hosted in a secure environment comprising an embedded universal integrated chip card, wherein the hosting of the plurality of virtual universal integrated chip cards enables the embedded universal integrated chip card to at least provide access to a plurality of mobile networks associated with different mobile service providers and operating in accordance with different wireless communication protocols;
   receive a request from a terminal application to execute an application of the one or more applications stored on the plurality of virtual universal integrated chip cards;
   determine a virtual universal integrated chip card identification relating to the requested application, wherein the virtual universal integrated chip card identification is configured to identify a logical channel for the requested application;
   provide, by the processor, location information for the requested application on a virtual universal integrated chip card, the location information being determined based at least on the virtual universal integrated chip card identification relating to the requested application; and
   cause the logical channel to be established with the requested application on the virtual universal integrated chip card using the determined virtual universal integrated chip card identification, wherein the logical channel is established by at least generating a command comprising at least one of the virtual universal integrated chip card identification, the requested application and a logical channel, and causing the generated command to be transmitted to an embedded universal integrated chip card that is hosting the virtual universal integrated chip card.

* * * * *